(12) United States Patent
Hur et al.

(10) Patent No.: US 7,336,645 B2
(45) Date of Patent: Feb. 26, 2008

(54) BLUETOOTH-IP ACCESS SYSTEM

(75) Inventors: Jeen Hur, Daejon-Shi (KR); Sang Baek Han, Daejon-Shi (KR); Hoo Sung Lee, Daejon-Shi (KR); Byung Jo Kim, Jeju-Do (KR); Sung Pack Hong, Gyeonggi-Do (KR); Seong Su Park, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 925 days.

(21) Appl. No.: 10/699,179

(22) Filed: Oct. 30, 2003

(65) Prior Publication Data

US 2004/0109441 A1 Jun. 10, 2004

(30) Foreign Application Priority Data

Dec. 9, 2002 (KR) .................. 10-2002-0077670

(51) Int. Cl.
*H04J 3/06* (2006.01)
*H04Q 7/24* (2006.01)

(52) U.S. Cl. ........................... 370/350; 370/338
(58) Field of Classification Search ............. 370/310, 370/331, 328, 338, 419, 420, 463, 350, 503
See application file for complete search history.

(56) References Cited

U.S. PATENT DOCUMENTS

| 6,288,645 | B1 | 9/2001 | McCall et al. | |
|---|---|---|---|---|
| 7,193,991 | B2 * | 3/2007 | Melpignano et al. | 370/352 |
| 2002/0012329 | A1 * | 1/2002 | Atkinson et al. | 370/330 |
| 2002/0193073 | A1 * | 12/2002 | Fujioka | 455/41 |
| 2003/0041199 | A1 * | 2/2003 | Kume et al. | 710/260 |
| 2005/0079817 | A1 * | 4/2005 | Kotola et al. | 455/41.2 |

FOREIGN PATENT DOCUMENTS

| KR | 2001-48328 | 6/2001 |
|---|---|---|
| KR | 1020010048328 | 6/2001 |
| KR | 1020010075866 | 8/2001 |
| KR | 2002-29028 | 4/2002 |

* cited by examiner

*Primary Examiner*—Chau Nguyen
*Assistant Examiner*—Christine Duong
(74) *Attorney, Agent, or Firm*—Blakely, Sokoloff, Taylor & Zafman

(57) ABSTRACT

The present invention relates to a Bluetooth-IP access system, and provides the Bluetooth-IP access system capable of performing broadband, large capacity and fast access by providing a Bluetooth-IP accessing device and a Bluetooth terminal with a module supporting broadband, large capacity, and fast search mounted therein.

21 Claims, 6 Drawing Sheets

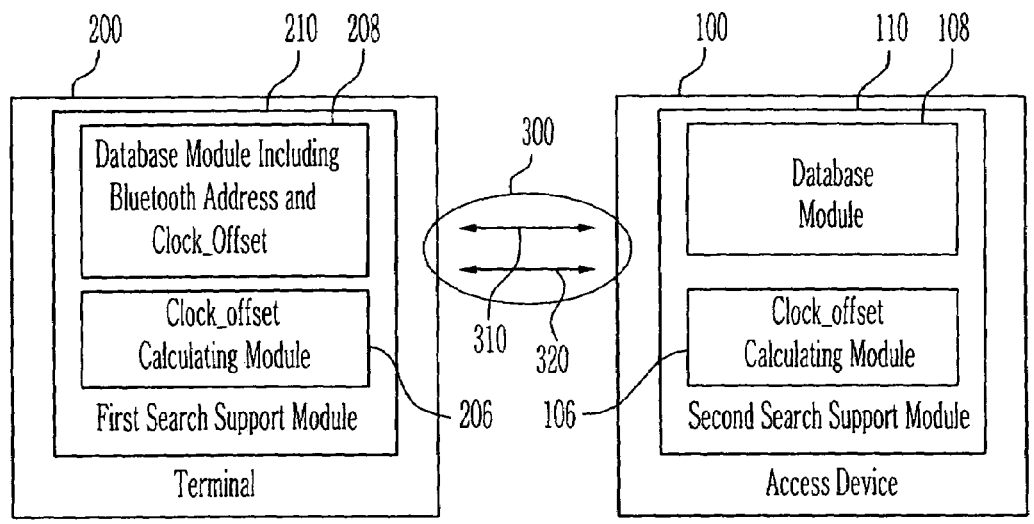
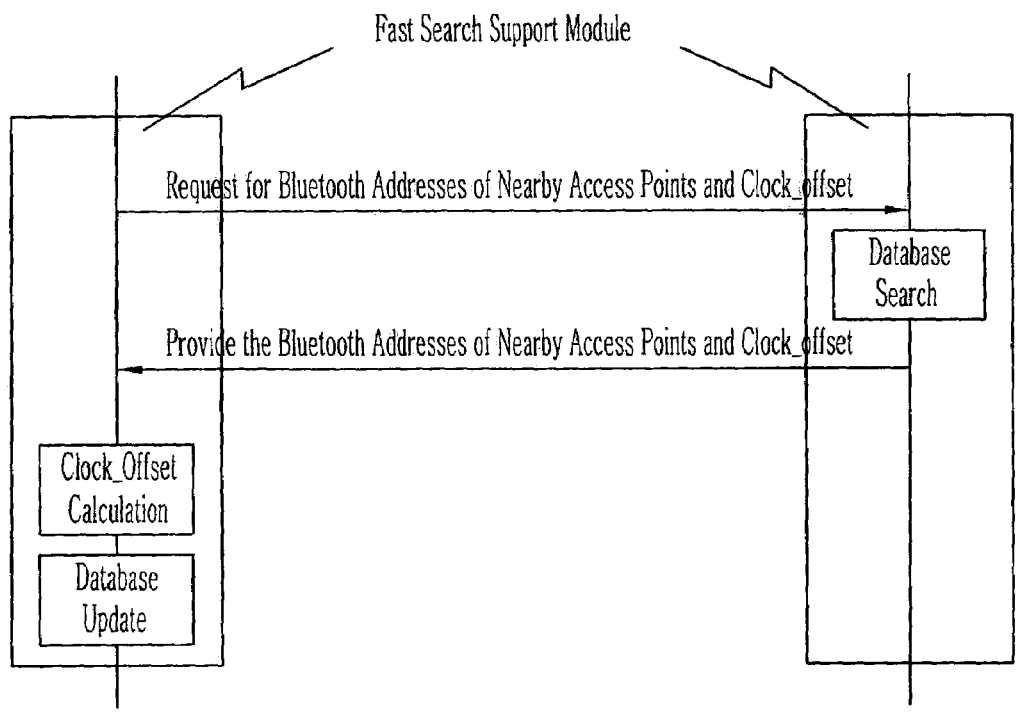

BLUETOOTH-IP ACCESS SYSTEM

BACKGROUND OF THE INVENTION

1. Field of the Invention

The present invention relates to a Bluetooth-IP access system, especially, to the Bluetooth-IP access system capable of fast accessing an IP based network through the Bluetooth in a Bluetooth terminal and a Bluetooth-IP access device having broadband and large capacity in addition to fast search function.

2. Description of the Prior Art

In a general Bluetooth-IP access system, a terminal comes into an inquiry state to search an access point, and the access point comes into an inquiry scan state to find nearby access points. The inquiry is designated as a process to find the clock and the device access code (DAC) present within the inquiry range.

When the access points receives the ID packet for inquiry in an inquiry scan state, it comes into the previous state of the inquiry scan state, and then stands by for 0 to 64 ms. At this time, if there is not external input, it comes into the inquiry scan state again, and if it receives the ID packet for inquiry, a Bluetooth device of the access point comes into the inquiry scan state and transmits the FHS (Frequency Hopping Synchronization) packet having an information for synchronizing frequency between different Bluetooth devices. After transmitting the FHS packet, the Bluetooth device increases an offset of an inquiry hop sequence by "1" and maintains the inquiry scan state again.

For example, it takes at least 2.56 sec for a Bluetooth terminal to perform search of 8 access points squarely and uniformly distributed. Furthermore, when any one of an access point and a terminal is transmitting data, it takes more time to perform search. The Bluetooth terminal can form ACL (Asynchronous Connection Less) link by paging with information included in the FHS packet obtained from the above-mentioned search result. Meanwhile, when the Bluetooth terminal perform paging, it uses clock_offset $CLKE_{27-2}$ included in the FHS packet in order to increase access speed.

If the distance for the simultaneous communication between 2 access devices and the terminal is 2 m, the Bluetooth terminal moving at a speed of 1 m/s has to search 8 nearby access points within 2 sec and connect the optimal access point to perform handoff without losing connection.

Therefore, to perform simultaneous communication between the Bluetooth terminal and 2 access devices in a prior art, the speed of the terminal has to be decreased or the distance between the Bluetooth terminal and 2 access devices has to be increased. Furthermore, the paging and inquiry for access point search change the frequency 3200 times per second, leading to the great interference and the power-consumption.

SUMMARY OF THE INVENTION

Therefore, the object of the present invention is to provide the Bluetooth system capable of having fast search time and sufficient access distance, and reducing power consumption of the terminal and interference effect as to other equipments by reducing search time of the access point.

The other object of the present invention is to provide the Bluetooth system capable of reducing the search time whereby the terminal searches the access point.

The present invention comprises a Bluetooth-IP access device for searching and storing information regarding nearby access points including Bluetooth addresses, a Bluetooth terminal for accessing the access points by receiving the information regarding nearby access points, or by searching and storing the information, and a communication link for connecting said Bluetooth-IP access device and said Bluetooth terminal, wherein mutual search is required by using said communication link, and Bluetooth addresses of nearby access points are provided by using said communication link.

The term "fast search" means that the present invention performs search with less time than the access point search time of the above-mentioned prior art. For example, according to the prior art, it takes about 2.56 sec to search 8 access points squarely and uniformly distributed.

A communication link can be implemented as wired or wireless such as Ethernet or Bluetooth. The physical positions of the Bluetooth-IP access points are defined to the antenna positions of the Bluetooth devices which every access device or terminal means has. The nearby access points means all access points at the vicinity of a specific access point wherein a terminal capable of performing communication with the specific access point can be connected to the all access points. Typically, a distance between access points capable of performing communication, varies to a propagation circumstance, and is about 10~50 m according to the Bluetooth specification.

Hereinafter, embodiments of the present invention wherein a communication link is Bluetooth communication ACL link will be explained with reference to the accompanying drawings. Although the present invention has been described in conjunction with the preferred embodiment, the present invention is not limited to the embodiments, can be implemented as various kinds of communication link and fast access support modules, and it will be apparent to those skilled in the art that the present invention can be modified in variation within the scope of the invention.

BRIEF DESCRIPTION OF THE DRAWINGS

FIG. 3 shows a concept view of the Bluetooth-IP access system including a clock_offset calculating module and a database module according to the present invention.

FIG. 4 shows a concept view for explaining operation principle of the fast search support module for faster access according to the present invention.

DESCRIPTION OF THE PREFERRED EMBODIMENT

Figure 1:
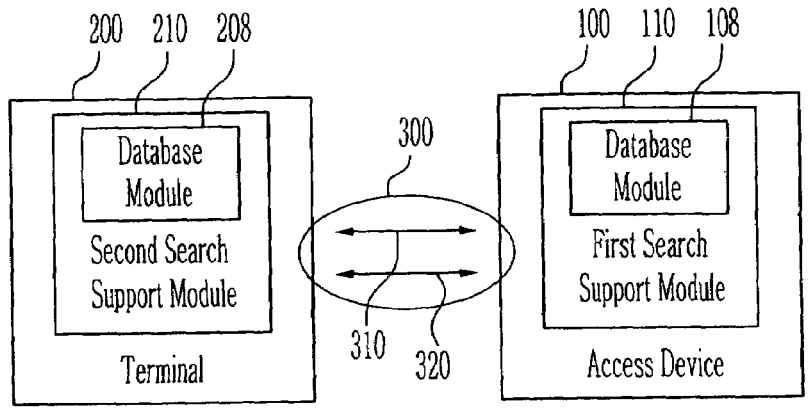
FIG. 1 shows a concept view of a Bluetooth-IP access system according to the present invention.

FIG. 1 shows a concept view of the Bluetooth-IP access system according to the present invention.

With reference to FIG. 1, The Bluetooth-IP access system comprises, a Bluetooth-IP access device 100, a terminal 200, and a communication link 300 between the Bluetooth-IP access device 100 and the terminal 200. The device 100 includes at least one Bluetooth-IP access point including a first search support module 110 capable of supporting fast search, and the first module includes a database 108 having Bluetooth addresses of nearby access points, and an automation means needed for fast search request/response. The terminal 200 includes at least one Bluetooth-IP access point including a second search support module 210 capable of supporting fast search, and the second module includes a database 208 having Bluetooth addresses of nearby access points, and an automation means needed for fast search request/response. And the communication link 300 includes fast search request information 310 and response information 320 for the fast search request FIG. 2 shows a concept view for explaining fast search procedure of the Bluetooth-IP access system according to the present invention.

Figure 2:
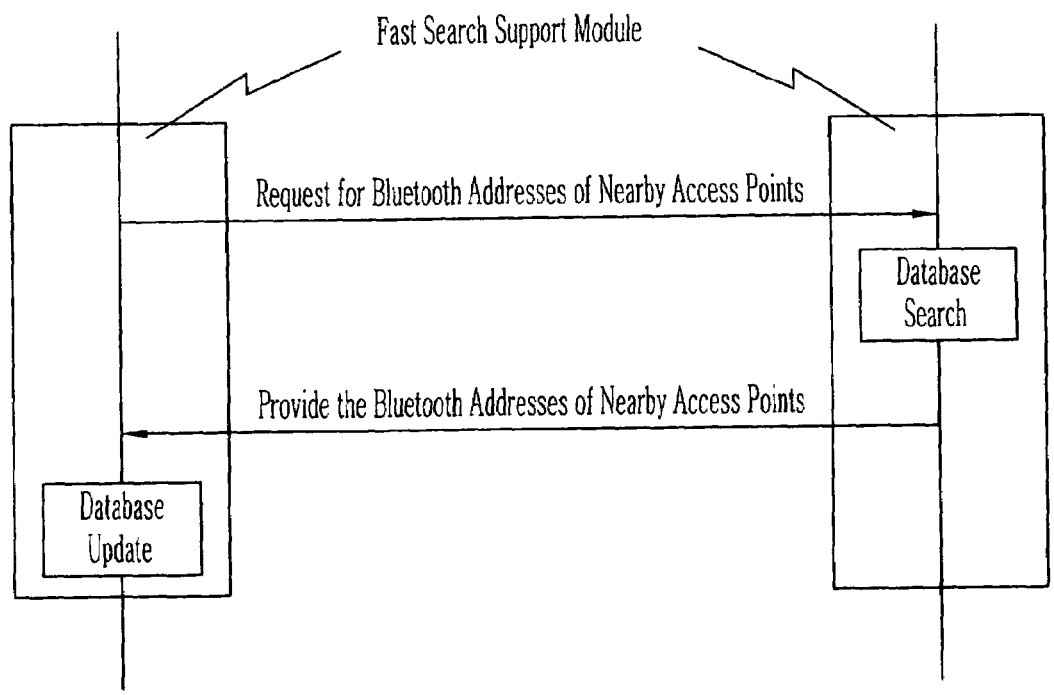
FIG. 2 shows a concept view for explaining fast search procedure of the Bluetooth-IP access system according to the present invention.

With reference to FIG. 2, unlike the method that searched the access point by the Bluetooth terminal of the prior art, the terminal 200 according to the present invention requests information (i.e., Bluetooth addresses of nearby access points and clock_offsets) to the first search support module 110 of the Bluetooth-IP access device 100 through the Bluetooth communication ACL link 300 by using the second search support module 210. The Bluetooth-IP access device 100 including a Bluetooth-IP access point which have received the fast search request refer to contents of the database module 108 by using the first search support module 110 and then provides the terminal 200 with Bluetooth addresses of nearby access points of the access point. The terminal 200 updates the Bluetooth address database module 208 of the nearby access points by using the second search support module 210, and uses the Bluetooth addresses of the nearby access points included in the database 208, thereby fast connection to the nearby access points can be realized.

In general, a Bluetooth address is required for a Bluetooth-IP access, and it is important to predict the Bluetooth paging scan frequency changing per 1.28 sec for faster access. To accomplish this, clock bits $CLK_{16-2}$ from the lower second clock bit to the higher $16^{th}$ clock bit of the clock_offsets of the nearby access points with regard to the terminal should be predicted. Therefore, FIG. 3 shows a concept view of a preferred embodiment of the present invention which supports faster access wherein said communication 300 is Bluetooth ACL communication, and a clock_offset calculating module is added to the first and second search support modules 110 and 210, and the database modules 108 and 208 are improved.

FIG. 3 shows a concept view of the Bluetooth-IP access system including a database module and a clock_offset calculating module according to the present invention.

The configuration of the embodiment with regard to FIG. 3 is as follows. The Bluetooth-IP access system in FIG. 3 comprises a Bluetooth-IP access device 100 including a second search support module 110 and at least one Bluetooth-IP access point, a terminal 200 including a first search support module 210 and at least one Bluetooth-IP access point, and a Bluetooth ACL communication link 300 connected between the Bluetooth-IP access device 100 and the terminal 200. The second search support module 110 includes a database 108 which includes Bluetooth addresses of nearby access points and selective clock_offset $CLK_{16-2}$, and a clock_offset calculating module 106 which calculates the sum of the clock_offsets of the nearby access points obtained from fast search and the clock_offsets of the terminal with regard to an automation means and an access point needed for fast search request/response. The first search support module 210 includes a database 108 which includes Bluetooth addresses of nearby access points and selective clock_offset $CLK_{16-2}$, and a clock_offset calculating module 106 which calculates the sum of the clock_offsets of the nearby access points obtained from fast search and the clock_offsets of the terminal with regard to an automation means and an access point needed for fast search request/response. A fast search request 310 by the Bluetooth ACL communication link 300 should have the request for Bluetooth addresses of nearby access points, and may have the request for information of clock_offsets of the nearby access points. When the Bluetooth-IP access device 100 receives the fast search request 310, it searches the database module 108 of the corresponding access point, and provides a response 320 to the fast search request 310. The response 320 to the fast search request 310 should have Bluetooth addresses of the nearby access points, and may have information for clock_offsets of the nearby access points in accordance with the fast search request 310. When the Bluetooth-IP access device performs fast search, the clock_offset calculating module 106 updates the clock_offset values of the nearby access points with regard to the access point which are stored in the database 108, which is the sum of a clock_offset of the terminal with regard to the access point and clock_offsets of nearby access points with regard to the terminal, as described in the equation 1 below.

$$\text{Clock\_offset values of the nearby access points with regard to the access point} = \text{clock\_offset of the terminal with regard to the access point} + \text{clock\_offsets of nearby access points with regard to the terminal} \quad \text{Equation 1}$$

When the terminal 200 performs fast search, the clock_offset calculating module 206 updates the clock_offsets of the nearby access points with regard to the terminal which is stored in the database 208, which is the sum of a clock_offset of the access point with regard to the terminal and clock_offsets of the nearby access points with regard to the access point, as described in equation 2 below.

$$\text{Clock\_offsets of the nearby access points with regard to the terminal} = \text{clock\_offset of the access point with regard to the terminal} + \text{clock\_offsets of the nearby access points with regard to the access point} \quad \text{Equation 2}$$

FIG. 4 shows a concept view for explaining operation principle of the fast search support module for faster access according to the present invention.

With reference to FIG. 4, When the terminal 200 requests clock_offsets and Bluetooth addresses of the nearby access points through the first fast search support module 210, the Bluetooth-IP access device 100 provide the terminal with the clock_offsets and the Bluetooth addresses of the nearby access points stored in the database by means of communication. The terminal 200 calculates and updates the clock_offsets by the information supplied from the Bluetooth-IP access device 100.

The procedure to obtain protocol information needed for an operation of the first and second search support module 210 and 110 can be implemented based on the service discovery protocol SDP defined in a Bluetooth specification. It is more useful in general situation to use the terminal 200 for fast search, however, the terminal 200 and the Bluetooth-IP access device 100 need not to be distinguished because the fast search procedures thereof are symmetric.

Meanwhile, clocks of the Bluetooth devices have finite exactness, so that the clock_offset values of the nearby access points with regard to the access point varies as time proceeds. Therefore, the Bluetooth-IP access device 100, if possible, needs to periodically update the clock_offset values of the nearby access points with regard to the access point through fast search.

A hardware configuration of the Bluetooth-IP access system including the above-described Bluetooth-IP access device 100 and the terminal 200 will be explained below.

Figure 5:
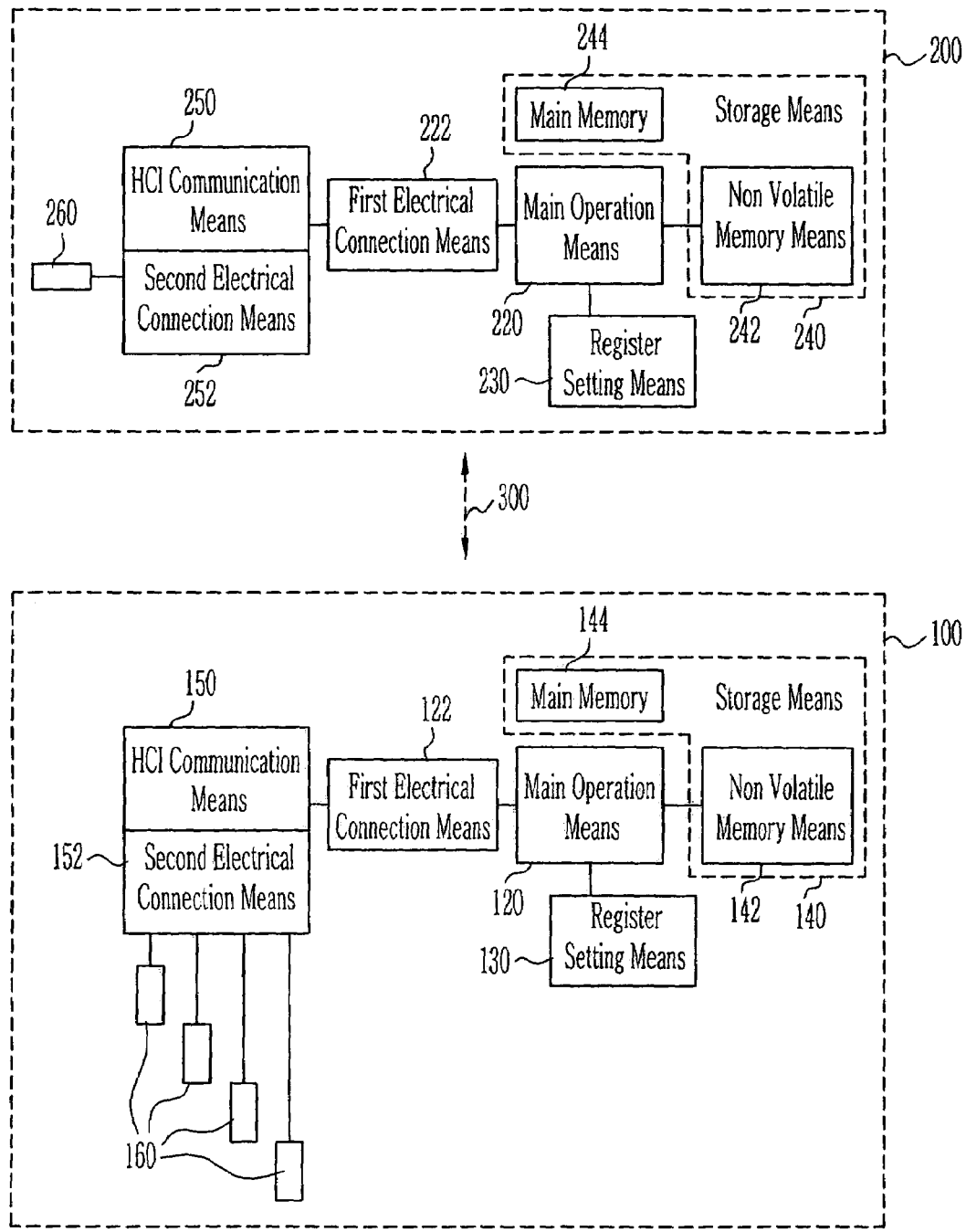
FIG. 5 shows a concept view of the hardware configuration of the Bluetooth-IP access system including fast search function according to the present invention.

FIG. 5 shows a concept view of the hardware configuration of the Bluetooth-IP access system including fast search function according to the present invention.

With reference to FIG. 5, a Bluetooth-IP access device 100 including at least one Bluetooth-IP access point includes, a main operation means 120, a register setting means 130, a storage 140, a HCI communication means 150, a Bluetooth device 160, a first electrical connection means 122 for electrically connecting the main operation means 120 and the HCI communication means 150, and a second electrical connection means 152 for electrically connecting the HCI communication means 150 and the Bluetooth device 160.

The main operation means 120 includes an operation means (not shown) and an control means (not shown) for processing data and controlling the peripheral devices, and also includes the register which is a temporary space that stores the location of data to be processed or the temporary result of operation present in the control means and operation means.

The register setting means 130 comprises a means that transmits the register values to the main operation means 120, which are needed for the operation of the main operation means 120 and also includes code positions that should be initially executed when a hardware is reset such as power on/off. The register setting means 130 is connected to the main operation means 120 and controls setting of registers within the main operation means 120.

The storage 140 comprises a non-volatile memory 142 and a main memory 144. The storage 140 is connected to the main operation means 120 through a chip select, a data bus, an address bus, and a control bus, and stores general program and data related to drive and run of the Bluetooth-IP access device 100. Also, The main operation means 120 can read and write the program and data of the storage 140. The HCI communication means 150 comprises, a RMII interface (reduced media independent interface), or a Ethernet interface (media independent interface; MII) having at least one port, or a UART host interface having at least one port, or a USB host interface having at least one port.

The first electrical connection means 122 provides a bi-directional data transmitting means between the HCI communication means 150 and the main operation means 120 through a chip select, a data bus, an address bus and an interrupt means. In a configuration of the second electrical connection means 152 thereof, the number of repeaters and the length of cables are limited to ensure the stable bi-directional data transmission between the HCI communication means 150 and the Bluetooth device 160. In other words, when the HCI communication means 150 is a universal serial bus (USB) interface, the number of the USB hub functions as a repeater and the length of the USB cable is important for the stable bi-directional data transmission. In other example, when the HCI communication means 150 is an Ethernet interface or a RMII interface, a cable of category-5 unshielded twisted pair (UTP) and a hub functions as a repeater can be included for the Ethernet communication. Bluetooth devices 160 use the version of Bluetooth specification 1.0 and more.

The Bluetooth terminal 200 comprises, a main operation means 220, a register setting means 230, a storage 240, a HCI communication means 250, a Bluetooth device 260, a first electrical connection means 222 for electrically connecting the main operation means 220 and the HCI communication means 250, and a second electrical connection means 252 for electrically connecting the HCI communication means 250 and the Bluetooth device 260.

The main operation means 220 includes an operation means (not shown) and an control means (not shown) for processing data and controlling the peripheral devices, and also includes the register which is a temporary space that stores the location of data to be processed or the temporary result of operation present in the control means and operation means.

The register setting means 230 comprises a means that transmits the register values to the main operation means 220, which are needed for the operation of the main operation means 220 and also includes code positions that should be initially executed when a hardware is reset such as power on/off. The register setting means 230 is connected to the main operation means 220 and controls setting of registers within the main operation means 220.

The storage 240 comprises a non-volatile memory 242 and a main memory 244. The storage 240 is connected to the main operation means 220 through a chip select, a data bus, an address bus, and a control bus, and stores general program and data related to drive and run of the terminal 200. Also, The main operation means 220 can read and write the program and data of the storage 240. The HCI communication means 250 comprises, a RMII interface (reduced media independent interface), or a Ethernet interface (media independent interface; MII) having at least one port, or a UART host interface having at least one port, or a USB host interface having at least one port.

The first electrical connection means 222 provides a bi-directional data transmitting means between the HCI communication means 250 and the main operation means 220 through a chip select, a data bus, an address bus and an interrupt means. In a configuration of the second electrical connection means 252 thereof, the number of repeaters and the length of cables are limited to ensure the stable bi-directional data transmission between the HCI communication means 250 and the Bluetooth device 260. In other words, when the HCI communication means 250 is a universal serial bus (USB) interface, the number of the USB hub functions as a repeater and the length of the USB cable is important for the stable bi-directional data transmission. In other example, when the HCI communication means 250 is an Ethernet interface or a RMII interface, a cable of category-5 unshielded twisted pair (UTP) and a hub functions as a repeater can be included for the Ethernet communication. Bluetooth devices 260 use the version of Bluetooth specification 1.0 and more.

Figure 6:
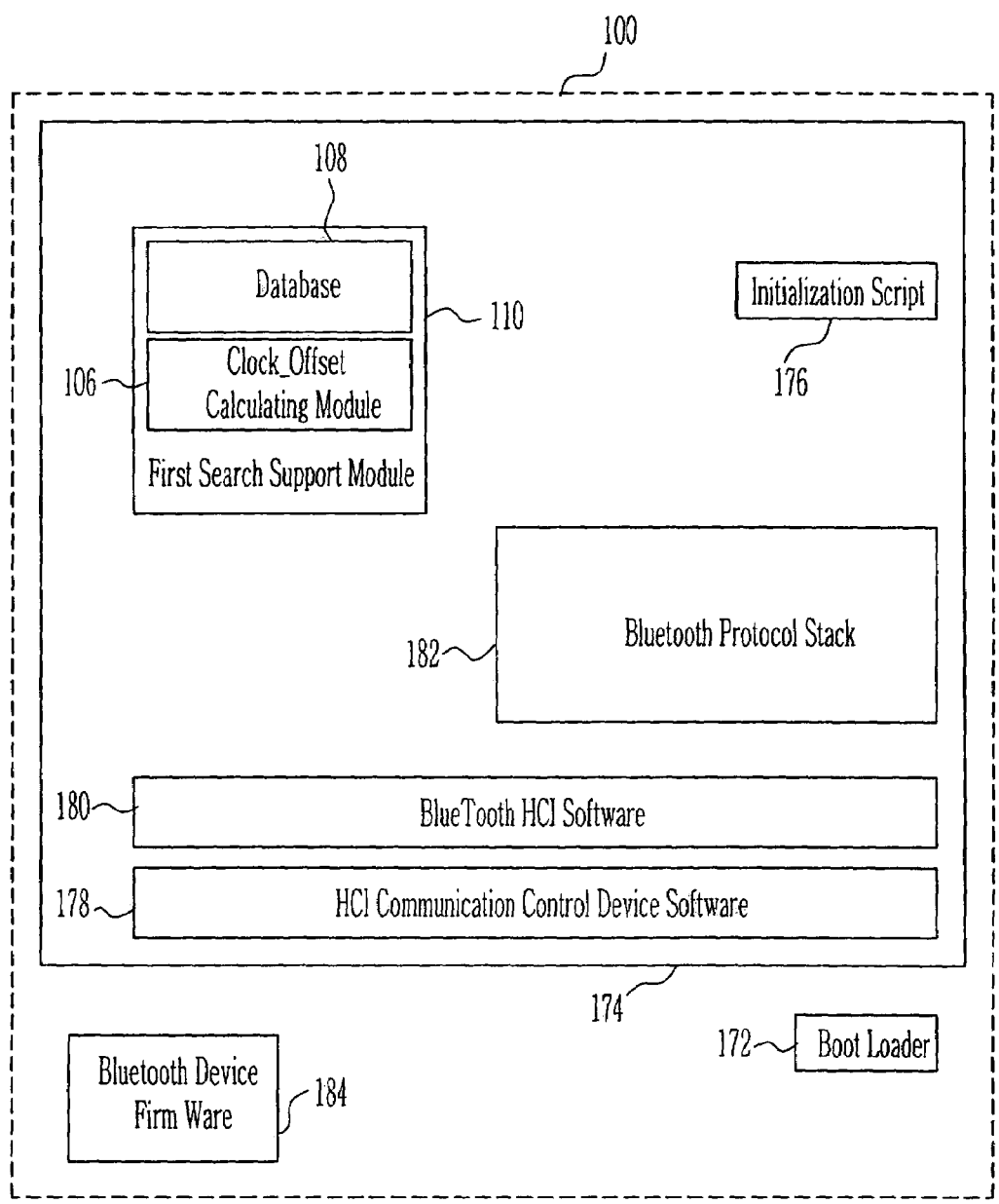
FIG. 6 shows a concept view for explaining configuration principle of software of a Bluetooth-IP access device according to the present invention.

FIG. 6 shows a concept view for explaining configuration principle of software of a Bluetooth-IP access device according to the present invention.

With reference to FIG. 6, the Bluetooth-IP access device 100 comprises, a boot loader 172, an operating system 174, an initialization script 176, HCI communication control device software 178, Bluetooth HCI software 180, a Bluetooth protocol stack 182, a first search support module 110, and a Bluetooth device firmware 184.

The boot loader 172 performs hardware initialization, specific program and supplies the specific program information to the operating system 174 when hardware is reset. The operating system 174 operates using the information supplied from the boot loader 172. The Initialization script 176 automatically initializes a necessary software and module of the operating system 174.

The first search support module 110 includes a clock_offset calculating module 106 and a database 108 having clock_offsets and Bluetooth addresses of the nearby access points.

A hardware configuration of the above-mentioned access device 100 and software operation will be explained below.

The main operation means 120 executes the boot loader 172 written in the non-volatile memory 142 within the storage 140 when the hardware is reset like a power on/off. The executed boot loader 172 initializes the main operation means 144 within the storage 140, drives the operating system 174, and supplies position and size information of the main memory 144 that is essential to drive the operating system 174. The operating system 174 executes the initialization script 176 and is driven by automatically initializing modules needed for the first search support module 110. The Bluetooth protocol stack 182 comprises at least a L2CAP layer and a SDP layer, and registers to a database of the SDP layer fast access protocol information for providing interconnection means between the L2CAP and the first search support module 110 according to the present invention.

Figure 7:
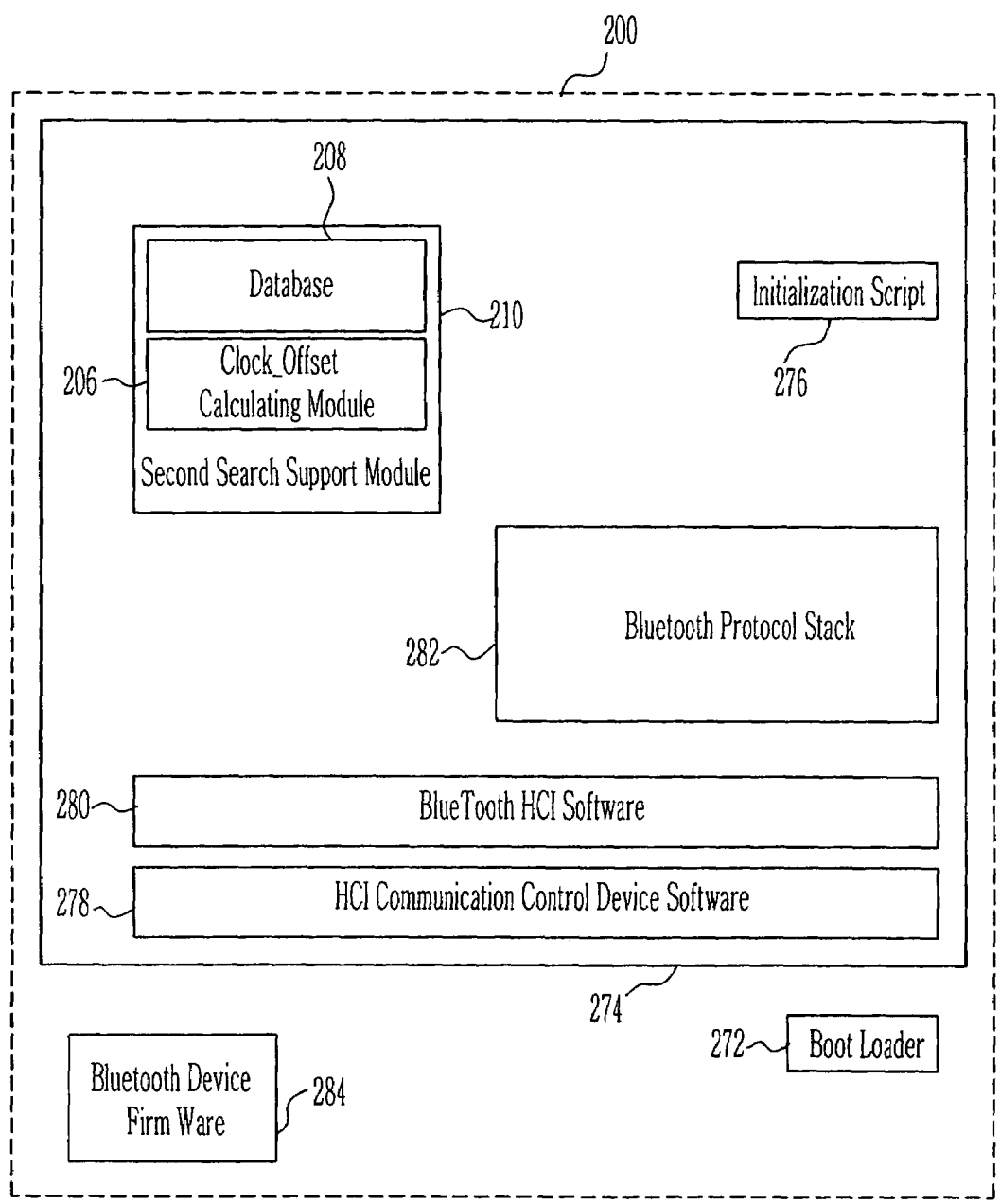
FIG. 7 shows a concept view for explaining configuration principle of software of a Bluetooth terminal according to the present invention.

FIG. 7 shows a concept view for explaining configuration principle of software of a Bluetooth terminal according to the present invention.

With reference to FIG. 7, the software configuration of the terminal 200 comprises, a boot loader 272 for performing a hardware initialization when a hardware is reset and executing a specific program and supplying the specific program information to an operating system 274, the operating system 274 operated by the information supplied from the boot loader 272, an initialization script driven by automatically initializing necessary software and hardware modules, a HCI communication control device software 278, a Bluetooth HCI stack 280 satisfied with the Bluetooth specification version 1.0 B and more, a Bluetooth protocol stack 282 satisfied with the Bluetooth specification version 1.0 B and more, and a second search support module 210. The Bluetooth protocol stack 282 comprises at least a L2CAP layer and a SDP layer, and registers to a database of the SDP layer fast access protocol information for providing interconnection means between the L2CAP and the second search support module 210 according to the present invention.

The second search support module 210 according to the present invention includes a clock_offset calculating module 206, and a database 208 having clock_offsets and Bluetooth addresses of the nearby access points supplied from the Bluetooth-IP access device 100. The main operation means 220 executes the boot loader 272 written in the non-volatile memory 242 when the hardware is reset like a power on/off. The executed boot loader 272 initializes the main operation means 244, drives the operating system 274, and supplies position and size information of the main memory 244 that is essential to drive the operating system 274. The operating system 274 executes the initialization script 276 and is driven by automatically initializing necessary software modules.

The Bluetooth-IP access devices 100 of the broadband and large capacity Bluetooth-IP access system according to the present invention store clock_offsets and Bluetooth addresses of the nearby access points to the database 108, and maintain an inquiry scan mode and a page scan mode.

Therefore, the Bluetooth terminal 200 that performs search can form an ACL link by accessing to one access point among access points that can be searched through paging procedure. A fast search procedure can be implemented to obtain clock information and Bluetooth addresses of the nearby access points by means of the ACL link formed with the Bluetooth-IP access device 100 or the Bluetooth terminal 200 or both thereof.

The fast search procedure performed by the Bluetooth terminal 200 is as follows. The terminal 200 obtains a protocol for fast search service by using SDP profile, and supplies a fast search request to the access point 100. The access device 100 including the access point that has received the fast search request transmits the clock_offsets and Bluetooth addresses of the nearby access points stored in the database 108. The clock_offset calculating module 206 adds values of the clock_offsets to the value of clock_offset of the access point with regard to the terminal 200, thereby obtains clock_offset values of the nearby access points with regard to the terminal 200, thereby updates the database 208. The terminal 200 can be accessed to the nearby access point by using the updated data in the database 208.

Figure 8:
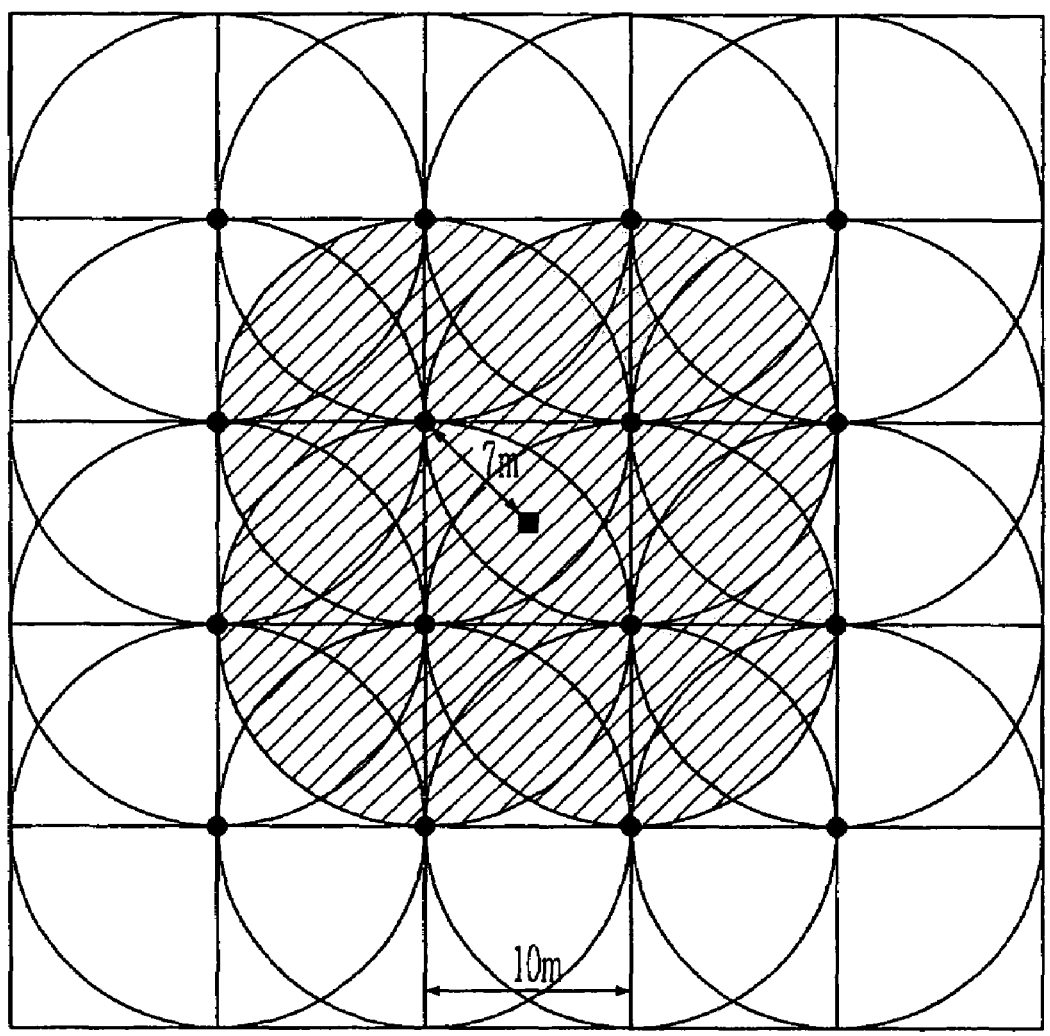
FIG. 8 shows a concept view for showing serviceable area of the Bluetooth-IP access device including 16 access points according to the present invention.

FIG. 8 shows a concept view for showing serviceable area of the Bluetooth-IP access device including 16 access points according to the present invention.

With reference to FIG. 8, the neighbor distance $\alpha$ of a typical Bluetooth communication distance is 10 m, and an electrical connection means between USB hubs and Bluetooth USB devices is implemented using 4 USB cables with $\sqrt{2}\alpha/2$ (m) in length. A length of the USB cable ensuring 12 Mbps in accordance with the USB specification 1 is 5 m, however, the length of the USB cable can be increased in consideration of low transmission speed of the Bluetooth, and the USB communication distance can be increased in consideration of USB hub usage. In this case, the service area provided by one broadband and large capacity Bluetooth-IP access system according to the present invention is three times as large as that of the prior art. Meanwhile, 4 USB hubs each having 4 ports are mounted to the access device by using cables with 7 m in length, and 4 Bluetooth-IP access devices are mounted to the USB hub having 4 ports by using cables with 0 m and 14 m in length and cables with 10 m in length, and 4 Bluetooth-IP access devices are mounted each of the rest 3 hubs in the same way, thereby the service area becomes 2400 $m^2$ in the configuration of FIG. 8. The cable with 0 m in length is a virtual cable that is very short in length or only consisted of connectors with no flexible portion. Meanwhile, in consideration of the Bluetooth communication speed and the USB communication speed, it is preferable that the number of the Bluetooth USB devices mounted to one USB host controller is not more than 16.

Meanwhile, it is well known to the skilled in the art that the HCI communication control device can be consisted of an Ethernet or UART with at least one port, however, as a matter of convenience, this is briefly described to for prevent the skilled from claiming right of a similar invention. The Bluetooth HCI includes a UART and a USB in accordance with the Bluetooth specification, and can be implemented as a serial communication like RS232C to increase the communication distance in case of the UART. For the bi-directional communication between the UART communication device and the main operation means, chips having at least one port have been used in the UART communication device using a chip select, a data bus, an address bus, and an interrupt. Meanwhile, HCI scheme using Ethernet interface and not based on the Bluetooth specification is published, and IEEE802.3af and its variation scheme provide in-line power by using use category-5 UTP cables.

Although the present invention has been described in conjunction with the preferred embodiment, the present invention is not limited to the embodiments, and it will be apparent to those skilled in the art that the present invention can be modified in variation within the scope of the invention.

As described above, as the Bluetooth-IP access device of the present invention including a Bluetooth-IP access point searches nearby access points of the access point, the nearby access points can be searched fast. This brings not only saving of propagation resource and of operating power, but also fast access to the nearby access point for the terminal, compared to the prior art.

What is claimed is:

1. A Bluetooth-IP access system, comprising:
a Bluetooth-IP access device for searching and storing information regarding nearby access points including Bluetooth addresses;
a Bluetooth terminal for accessing the access points by receiving the information regarding nearby access points including clock offset information, or by searching and storing the information; and
a communication link for connecting said Bluetooth-IP access device and said Bluetooth terminal,
wherein a search is performed by using said communication link,
Bluetooth addresses of nearby access points are provided to said Bluetooth terminal by using said communication link, and said Bluetooth-IP access device includes a search support module, said search support module including:
a database having Bluetooth address information and 2nd to 16th clock bit information in said clock offset information of said nearby access points, and
a module calculating said clock offset,
wherein selective search response of said clock offset information is performed in accordance with a search request of said Bluetooth terminal.

2. The device as claimed in claim 1,
wherein said communication link is a Bluetooth ACL link.

3. The device as claimed in claim 1,
wherein said information regarding said nearby access points further includes $clock_{13}$ offset information.

4. The device as claimed in claim 1,
wherein
a selective search for the clock_offset information is sent to the Bluetooth-IP access device.

5. The device as claimed in claim 1,
wherein a hardware of said Bluetooth-IP access device includes,
a main operation means in charge of operation within said Bluetooth-IP access device;
a register setting means for setting the hardware state within said Bluetooth-IP access device through said main operation means;
a static data storage for storing data and program module needed for booting said Bluetooth-IP access device and read by said main operation means;
a HCI communication means for bi-directional communication between said main operation means and a plurality of Bluetooth-IP access devices;
a first electrical connection means for electrically connecting said HCI communication means and said main operation means; and
a second electrical connection means for electrically connection connecting said HCI communication means and said Bluetooth-IP access device.

6. The device as claimed in claim 1,
wherein a software of said Bluetooth-IP access device includes,
a boot loader for performing hardware initialization when the hardware is reset, performing specific program, and supplying information of said specific program;
an operating system operated by using said program information supplied from said boot loader;
an initialization script for automatically initializing and driving desired software and hardware module by said operating system; a software of HCI communication device for controlling said HCI communication device;
a Bluetooth HCI software and a Bluetooth protocol stack satisfied with at least specification 1.0 B; and
a module for supporting fast search, having a database consisted of Bluetooth addresses of nearby access points, and an automation means needed for fast search request and response.

7. The device as claimed in claim 1,
wherein a hardware of said Bluetooth terminal includes,
a main operation means in charge of operation within said terminal;
a register setting means for setting the hardware state within said Bluetooth-IP access device through said main operation means;
a static data storage for storing data and program module needed for booting said Bluetooth-IP access device and read by said main operation means;
a dynamic data storage for storing data and program module needed for operating said Bluetooth-IP access device and read and written by said main operation means;
a HCI communication means for bi-directional communication between said main operation means and a plurality of Bluetooth-IP access devices;
a first electrical connection means for electrically connecting said HCI communication means and said main operation means; and
a second electrical connection means for electrically connecting said HCI communication means and said Bluetooth-IP access device.

8. The device as claimed in claim 1,
wherein a software of said Bluetooth terminal includes,
a boot loader for performing hardware initialization when the hardware is reset, performing specific program, and supplying information of said specific program;
an operating system operated by using said specific program information supplied from said boot loader;
an initialization script for automatically initializing and driving desired software and hardware module by said operating system;
a software of HCI communication device for controlling said HCI communication device;
a Bluetooth HCI software and a Bluetooth protocol stack satisfied with at least specification 1.0 B; and
a module for supporting fast search, having a database consisted of Bluetooth addresses of nearby access points, and an automation means needed for fast search request and response.

9. The device as claimed in claim 8,
wherein said automation means performs selective fast search request and selective fast search response.

10. The device as claimed in claim 5,
wherein said HCI communication means includes an USB host interface of at least one port.

11. The device as claimed in claim 5,
wherein said HCI communication means includes an UART host interface of at least one port.

12. The device as claimed in claim 5,
wherein said HCI communication means includes an Ethernet interface of at least one port.

13. The device as claimed in claim 5,
wherein said first electrical means includes a chip selector, a data bus, an address bus, and an interrupt means.

14. The device as claimed in claim 5,
wherein said second electrical means includes USB cables with the lengths of 0, $\sqrt{2}\alpha/2$ where $\alpha$ is the shortest neighbor distance in the case that AP's are uniformly and squarely distributed.

15. The device as claimed in claim 14,
wherein said second electrical means includes an USB hub means of at least one port.

16. The device as claimed in claim 7,
wherein said HCI communication means includes an USB host interface of at least one port.

17. The device as claimed in claim 7,
wherein said HCI communication means includes an UART host interface of at least one port.

18. The device as claimed in claim 7,
wherein said HCI communication means includes an Ethernet interface of at least one port.

19. The device as claimed in claim 7,
wherein said first electrical means includes a chip selector, a data bus, an address bus, and an interrupt means.

20. The device as claimed in claim 7,
wherein said second electrical means includes USB cables with the lengths of 0, $\sqrt{2}\alpha/2$ where $\alpha$ is the shortest neighbor distance in the case that access points are uniformly and squarely distributed.

21. The device as claimed in claim 20,
wherein said second electrical means includes an USB hub means of at least one port.

* * * * *